United States Patent
Koch

(10) Patent No.: US 8,727,386 B2
(45) Date of Patent: May 20, 2014

(54) TORSION-PROOF HOSE CONNECTION

(75) Inventor: Matthias Koch, Niefern-Oschelbronn (DE)

(73) Assignee: Eaton Fluid Power GmbH, Baden-Baden (DE)

( * ) Notice: Subject to any disclaimer, the term of this patent is extended or adjusted under 35 U.S.C. 154(b) by 11 days.

(21) Appl. No.: 12/663,035

(22) PCT Filed: Jun. 2, 2008

(86) PCT No.: PCT/EP2008/004370
§ 371 (c)(1), (2), (4) Date: Mar. 31, 2010

(87) PCT Pub. No.: WO2008/148510
PCT Pub. Date: Dec. 11, 2008

(65) Prior Publication Data
US 2010/0194100 A1    Aug. 5, 2010

(30) Foreign Application Priority Data
Jun. 6, 2007 (DE) .......................... 10 2007 026394

(51) Int. Cl.
*F16L 33/00* (2006.01)

(52) U.S. Cl.
USPC .......................... 285/256; 285/242

(58) Field of Classification Search
USPC .......................... 285/242, 256, 241, 382, 259; 29/890.15, 508, 516
See application file for complete search history.

(56) References Cited

U.S. PATENT DOCUMENTS

| | | | |
|---|---|---|---|
| 2,314,002 A | | 3/1943 | Lusher et al. |
| 3,165,338 A | * | 1/1965 | Moss ............................ 285/256 |
| 3,345,091 A | * | 10/1967 | Nicol ............................ 285/256 |
| 4,366,841 A | | 1/1983 | Currie et al. |
| 4,817,997 A | * | 4/1989 | Ingram ......................... 285/256 |
| 5,597,186 A | * | 1/1997 | Ridenour et al. ............. 285/330 |
| 6,318,763 B1 | * | 11/2001 | Huang .......................... 285/256 |
| 6,575,500 B1 | * | 6/2003 | Wili ............................. 285/243 |

(Continued)

FOREIGN PATENT DOCUMENTS

| | | |
|---|---|---|
| DE | 3808383 A1 | 12/1988 |
| DE | 10104448 A1 | 2/2001 |
| EP | 0057920 A1 | 8/1982 |
| GB | 2091832 A | 8/1982 |

OTHER PUBLICATIONS

European Patent Office, International Search Report in counterpart PCT/EP2008/004370, filed Jun. 2, 2008, mailed Nov. 19, 2008.

*Primary Examiner* — Aaron Dunwoody
(74) *Attorney, Agent, or Firm* — Dykema Gossett PLLC

(57) ABSTRACT

A connecting device for connecting a hose in a fluid-conveying system including a nipple and a compression sleeve. The nipple has a rotation-symmetrical hose-receiving section and, at a distance therefrom, an anti-twist section that is configured in a non-circular manner, at least after a connection has been established between said hose and the nipple. The compression sleeve is configured to extend over the hose-receiving section and over the anti-twist section. The compression sleeve is further configured for a positive-locking engagement with respect to a relative rotation in the anti-twist section. The anti-twist section is configured as a non-circular deformation of at least part of the nipple. A method for establishing an anti-twist connection between a nipple and a hose using a compression sleeve is also disclosed.

9 Claims, 2 Drawing Sheets

(56) References Cited

U.S. PATENT DOCUMENTS

| | | | |
|---|---|---|---|
| 6,619,699 B2* | 9/2003 | Brumfield | 285/256 |
| 6,764,106 B1* | 7/2004 | Smith et al. | 285/256 |
| 7,014,218 B2* | 3/2006 | Fisher et al. | 285/256 |
| 7,708,318 B2* | 5/2010 | Thrift et al. | 285/256 |
| 2002/0092719 A1* | 7/2002 | Brumfield et al. | 188/152 |
| 2004/0020545 A1* | 2/2004 | Takagi et al. | 138/109 |
| 2004/0032124 A1 | 2/2004 | Lefere et al. | |
| 2004/0104572 A1* | 6/2004 | Gilbreath | 285/256 |
| 2004/0145182 A1* | 7/2004 | Smith et al. | 285/256 |
| 2005/0040646 A1* | 2/2005 | Brumfield et al. | 285/256 |
| 2008/0185840 A1* | 8/2008 | Menor | 285/256 |
| 2008/0309075 A1* | 12/2008 | Marina | 285/256 |
| 2010/0140926 A1* | 6/2010 | Swift et al. | 285/256 |

* cited by examiner

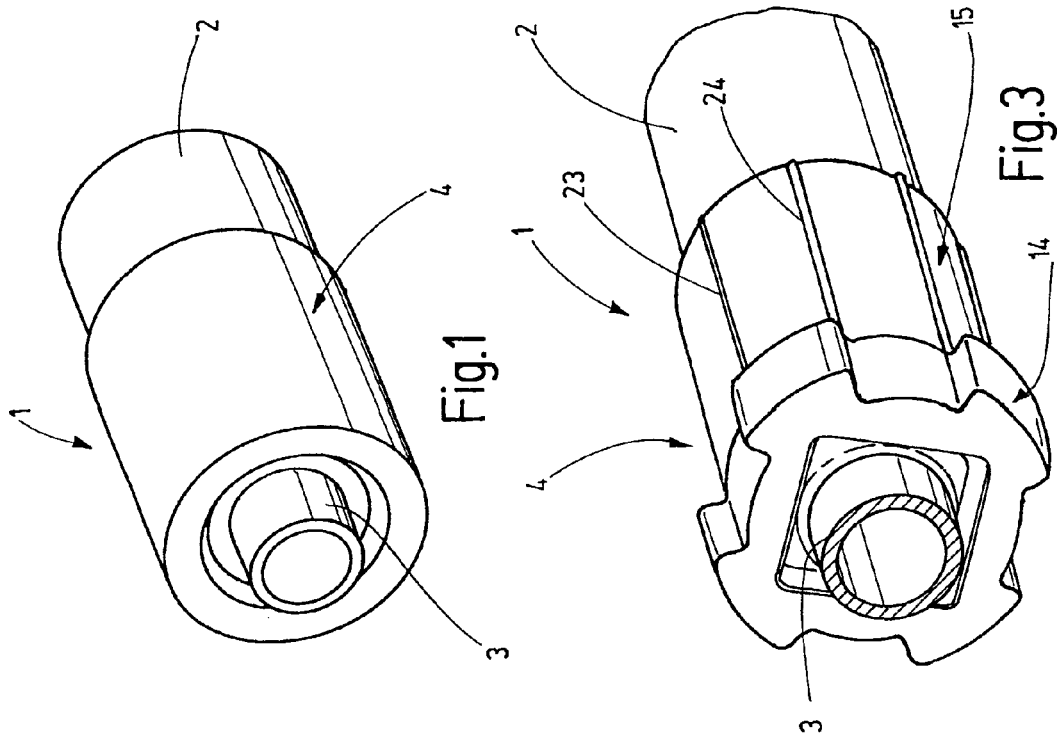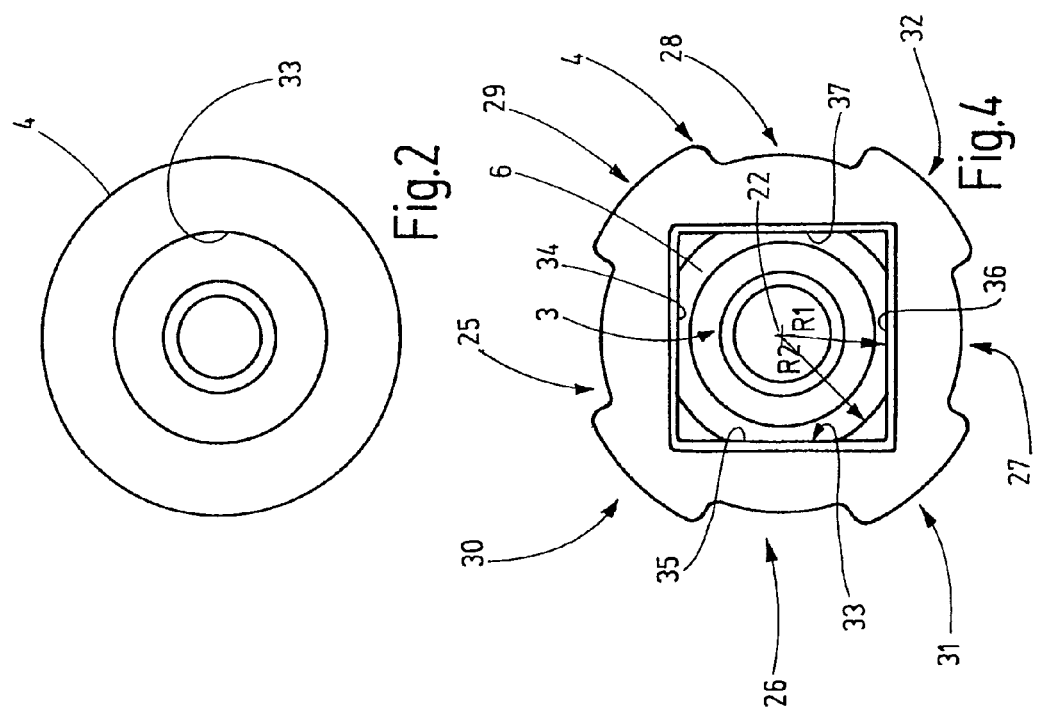

TORSION-PROOF HOSE CONNECTION

BACKGROUND

The invention relates to a connecting device for fluid-conveying systems, in particular, for the connection of a hose, as well as to a connecting method.

Fluid-conveying systems frequently use hoses having ends that are connected to other line or devices. These hose connections are subject to considerable mechanical stresses which must not compromise the seal between the hose and the nipple or any added lines. Frequently, connecting means are used that are based on the plastic deformation of a sleeve extending over the hose. To achieve this, for example, document DE 38 08 383 A1 discloses a nipple and a hose-receiving section that has a conical, cylindrical or other profile and ribs, as well as a compression sleeve that at least extends over said ribs to achieve axial securing, and that clamps the hose in place on the hose-receiving section of the nipple, when said hose-receiving section is deformed, i.e., compressed, in axially inward direction.

Such a compression sleeve has also been known, for example, from document DE 101 04 448.

The connection of a nipple with a hose by means of a compression sleeve has also been known from document EP 0 057 920 A1. Again, the nipple has a cylindrical hose-receiving section and a rib that is provided adjoining said hose-receiving section. The compression sleeve extends over the rib, thus securing said sleeve on the nipple in axial direction. The compression sleeve has several peripherally extending ribs on its inside peripheral surface. When the hose is slipped onto the nipple, said compression sleeve is compressed in radially inward direction, so that its ribs are pressed into the hose and thus tightly secure said house in axial direction and in a fluid-tight manner on the nipple.

Such compression connections have been widely accepted. However, they can cause problems when the hose and the nipple are stressed relative to each other due to a torsional moment. Such torsional moments can occur due to movements of the components connected to each other by the hose, or even by vibrations, temperature changes during assembly, or as a result of assembly. It must be ensured that such torsional moments do not compromise the connection between the hose and the nipple. This problem is becomes more pronounced as the fluid pressures to be endured by the hose become greater. Increasing pressure requires an increasingly stiffer hose wall. A particularly stiff hose already generates a significant counter-torque when its ends are only slightly rotated relative to each other, this counter-torque stressing the connection site between the nipple and the hose. In the course of time, such stresses can cause the nipple to loosen or to impair its seal.

Considering this, it is the object of the invention to create a connection device for fluid-conveying systems which is insensitive to relative torsional moments. In addition, a corresponding method of connection is to be provided.

BRIEF SUMMARY

The connecting device in accordance with the invention comprises at least one nipple and a compression sleeve that are connected to each other in a non-twistable manner by positive-locking connection. The positive connection between the nipple and the compression sleeve is formed by an anti-twist section provided on the nipple and by a correspondingly formed section of the compression sleeve. The anti-twist section of the nipple preferably has a non-circular exterior form while the corresponding section of the compression sleeve has preferably a non-circular interior form. The exterior form of the anti-twist section and the interior form of the corresponding section of the compression sleeve are complementary to each other and create a torsion-proof toothing between the nipple and the compression sleeve. The toothing is preferably created in that the nipple has a first radius R1 at least at one point, said radius R1 being smaller than a second radius R2 at a second point at a distance in circumferential direction. The compression sleeve and the nipple are in contact with each other at least at the first point. In so doing, the torsional moment acting on the hose cannot lead to a twisting of the hose, including the compression sleeve on the nipple.

The non-circular form of the anti-twist section and the corresponding form of the compression sleeve are preferably created by a plastic reformation, are preferably rotation-symmetrical prior to the assembly of the hose. The positive-locking connection by fitting engagement of the non-circular sections of the compression sleeve and the nipple is thus created only at the time of assembly of the hose. The advantage of this measure is that the hose may be installed on the nipple in any desired position of rotation. No rotary alignment is required between nipple and hose or compression sleeve. In addition, the assembly occurs without requiring that the nipple and the compression sleeve be turned in opposite directions relative to each other. Thus, assembly may be achieved without problems even if the relative positions of rotation of the nipple and the hose prior to compressing the compression sleeve are fixed, for example, because the respective ends of the hose and the nipple have already been fixed with respect to their position of rotation.

In the present document, the "position of rotation" is understood to mean a rotation of the nipple or hose about its respective longitudinal axis.

Preferably, the positive engagement between the nipple and the compression sleeve is achieved on an originally round annular bead of the nipple, said bead extending radially outward from the otherwise at least approximately cylindrical outside surface of the nipple. This annular bead may have been produced by upsetting the nipple. When the compression sleeve and the nipple are compressed, the compression sleeve is deformed inward at several points at a distance from each other in circumferential direction, so that said compression sleeve is imparted with, for example, a polygonal inside cross-section in this region. In so doing, said compression sleeve deforms the annular bead which thus takes on a non-circular, for example, tetragonal form, with potentially rounded edges. Other forms, for example, pentagonal or hexagonal forms, or forms having one or more locally radial inward-directed deformations to produce the desired toothing between the nipple and the compression sleeve, are possible.

Preferably, the compression sleeve comprises at least one inward-directed rib that extends between two annular beads of the nipple when the compression sleeve has been compressed in radial direction. The two annular beads of the nipple may have different outside diameters. The diameters of the annular beads and the inward-directed rib on the compression sleeve may be adapted to each other, so that—already in non-compressed state—a desired axial positioning is achieved, for example, in that one of the annular beads forms an abutment for the rib of the compression sleeve. Preferably, this is the annular bead that is to be deformed so as to be non-circular during the compression operation.

Referring to the method of the invention, the hose is slipped onto a hose-receiving section of the nipple, and the compression sleeve is situated in such a manner that its hose-securing section extends over the hose and that its anti-twist part extends over an anti-twist section of the nipple. Subsequently, the compression sleeve is deformed radially inward in such a manner that a non-circular joint is formed between the compression sleeve and the nipple. This joint forms a positive-locking toothing between the compression sleeve and the nipple.

BRIEF DESCRIPTION OF THE DRAWINGS

Additional details of advantageous embodiments of the invention result from the drawings, the description or the claims. The description is restricted to essential aspects of the invention or other miscellaneous situations. The drawings disclose additional details. To this extent, they should be considered supplementary. The drawings show an exemplary embodiment of the invention.

FIG. 1 a nipple with the hose and the compression sleeve prior to compression;

FIG. 2 a frontal view of the nipple and the compression sleeve in accordance with FIG. 1, illustrated in a different size;

FIG. 3 a perspective view of the nipple, the hose and the compression sleeve after compression;

FIG. 4 a frontal view of the nipple and the compression sleeve in accordance with FIG. 3, on a different scale;

DETAILED DESCRIPTION

Figure 5:
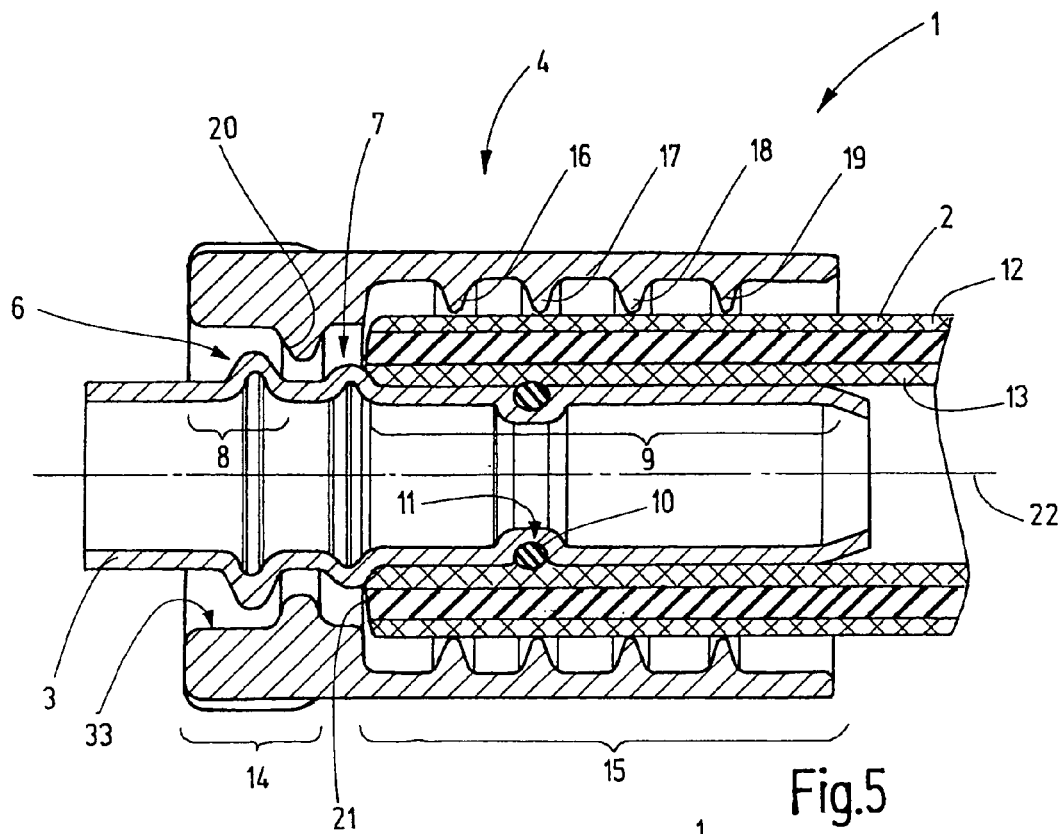
FIG. 5 a view, longitudinally in section, of the nipple, the hose and the compression sleeve prior to compression; and, FIG. 6 a longitudinal section of the nipple, the hose and the compression sleeve after compression.

FIG. 3 shows a connecting device 1 which is used to create a connection between the hose 2 and a nipple 3. The nipple 3 is part of the connecting device 1 that additionally includes a compression sleeve 4. While FIG. 3 shows the connecting device 1 in assembled state, i.e., following the attachment of the hose 2 to the nipple 3, FIG. 1 is used to illustrate the connecting device 1 prior to the connection of the hose 2 to the nipple 3. As is shown, in particular, by the comparison of FIGS. 2 and 4, the connection is achieved by a plastic deformation of the compression sleeve 4 and, in part, of the nipple 3. As is obvious from FIG. 5, the nipple 3 is provided with at least one, but preferably more, e.g., two annular beads 6, 7, which may have the same or also different outside diameters. The nipple 3 has an anti-twist section 8 that, for example, can be created in the region of the annular bead 6. In addition, the nipple 3 has a hose-receiving section 9 having, for example, a conical and/or cylindrical outside circumference. If necessary, this outside circumference may have additional, not illustrated, contours in order to secure the hose 2 in axial direction. In addition, the hose-receiving section 9 may be provided with one or more annular grooves 10, which, e.g., are disposed to accommodate an O-ring 11 or another sealing means.

On its other side, i.e., the side opposite the hose-connecting section 9, the nipple 3 may terminate in a pipeline that is provided with a threaded section of other connecting means or have other means that permit said nipple's connection with other fluid channels.

The hose to be received by the nipple 3 is preferably a plastic hose that may be reinforced, for example, with a woven fabric. Preferably, said hose is provided on its inside, as well as on its outside, with a plastic material surface 12, 13, for example, an elastomer layer.

In its original state in accordance with FIGS. 1 and 2 or also FIG. 5, the compression sleeve 4 is configured in a rotation-symmetrical manner. It has a part 14 that extends over the anti-twist section 8. In addition, it has another section 15 that extends over the hose-receiving section 9 and is disposed to secure the hose 2 on the nipple 3. The section 15 is provided on the inside with projections, for example, having the configuration of teeth or ribs 16, 17, 18, 9 that project in radially inward direction toward the hose 2 and that have an inside diameter in non-compressed state, said inside diameter being greater than the outside diameter of the hose 2.

In the region of part 14, or between part 14 and section 15, the compression sleeve 4 may be provided with an additional radially inward-projecting rib 20 that, in assembled stated, extends between the annular beads 6, 7. FIG. 5 shows an example of the dimensions of the diameter. For example, the rib 20 has an inside diameter that is greater than the outside diameter of the annular bead 7 but is smaller than the outside diameter of the annular bead 6. Consequently, the assembly of the connecting device 1 is facilitated. This is accomplished as follows:

First, the compression sleeve 4, in its state in accordance with FIGS. 1, 2 and 5, as well as the hose 2, are slid onto the nipple 3. The front end of the hose 2 abuts against the annular bead 7. The axial movement of the compression sleeve 4 is limited, on the one hand, by the front end 21 of the hose 2 and, on the other hand, by the annular bear 6. Said compression sleeve can be brought in any desired position of rotation, whereby the expression "position of rotation" is to be understood with reference to a joint central longitudinal axis 22.

Now, a compression operation is performed in that the compression sleeve 4 is converted from its form in accordance with FIGS. 1 and 2 into a form in accordance with FIGS. 3 and 4. To do so, the compression sleeve is deformed differently in part 14 and section 15. In section 15, the previously rotation-symmetrical compression sleeve 4 is deformed radially inward in a largely uniform manner, so that said compression sleeve remains largely rotation-symmetrical. As indicated by FIG. 3, said compression sleeve may have several longitudinally extending ribs 23, 24, and so on. However, such minimal deviations from the rotational symmetry do not lead to a non-circular deformation of the hose-receiving section 9 of the nipple 3. Therefore, the section 15—even though its cross-section exhibits minimal deviations from the circular form—is viewed as being rotation-symmetrical.

In contrast, the part 14 is compressed in radially inward direction, for example, at several points 25, 26, 37, 28 that are at a distance from each other in circumferential direction, whereby minimal or no pressure is applied to other points 29, 30, 31, 32, so that these points 29 through 30 are not deformed inward or may even be able to yield in outward direction. As is shown by FIG. 4, the originally essentially cylindrical inside wall 33 of the part 14 thus substantially deviates from the circular form. In that case, the wall 33 has received a square form. The square form is delimited by approximately planar surfaces or edges. However, these edges may also have another form, for example, they may dip toward the longitudinal central axis 22.

The non-circular deformation of the part 14 results in a deformation of the annular bead 6, so that said bead is imparted with several surface sections 34, 35, 36, 37 that clearly deviate from the circular form. Said surface sections are in firm abutment with the wall 35 and form a square profile that is tightly enclosed by the opening delimited by the wall 33, said opening also being square. In this manner, a torsion-proof positive-locking engagement between the nipple 3 and the compression sleeve 4 is established.

The described deformation may be restricted to the annular bead 6 or may also comprise adjacent parts of the nipple 3. Likewise, the rib 20 may also be affected by said non-circular deformation.

Figure 6:
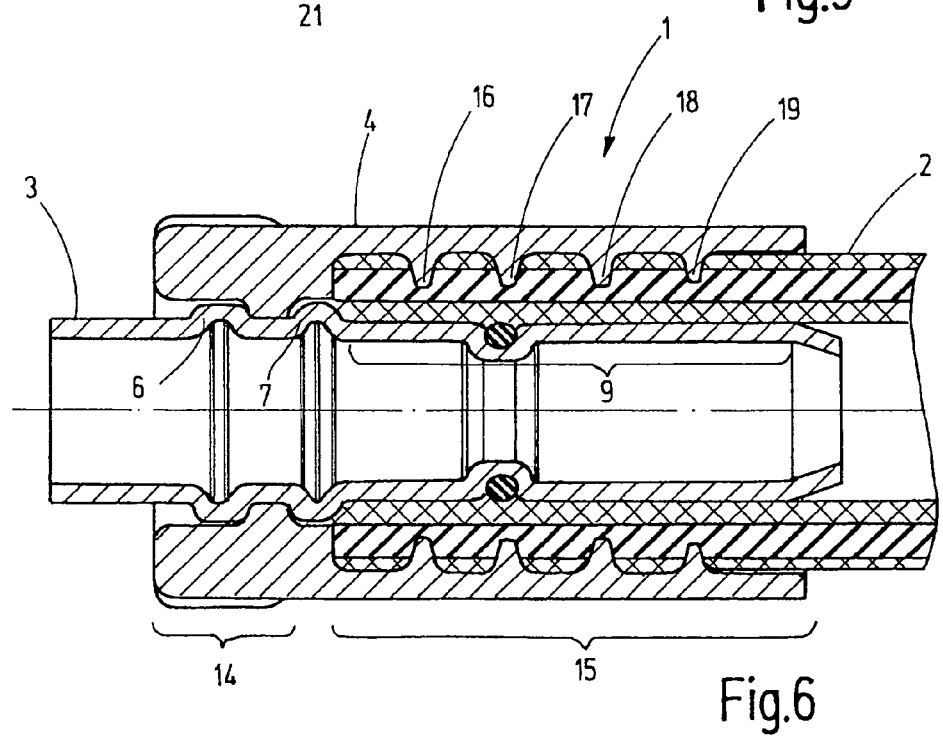

Referring to the compressed state as in FIG. 6, the ribs 16, 17, 18 displace material of the hose 2, pressing said hose tightly against the hose-receiving section 9. This produces a seal and secures the hose 2 on the nipple 3 in axial direction. In addition, the rib 20, which now has a reduced diameter, extends between the annular beads 6, 7 and thus secures the compression sleeve 4 on the nipple 3 in axial direction. The part 14 of the compression sleeve 4 that has been compressed in a non-circular manner is now in a torsion-proof engagement with the equally non-circularly compressed annular bead 6 and thus forms an anti-rotation means that is effective between the nipple 3 and the compression sleeve 4. In this manner, a mechanically particularly stable compression connection, which can be stressed in particular by the torsional moment, is provided, said compression connection permanently securing the hose 2 on the nipple 3. It is pointed out that the inventive device and the inventive method may be modified. For example, the compression sleeve 4—in uncompressed state—may already be non-circular, e.g., square, in its region extending over the anti-twist section 8. During compression, the cross-section is reduced, whereby the initially round bead 6 is impressed with the non-circular form by said compression sleeve. It is also possible to make the anti-twist section 8 of the nipple 3 non-circular from the start, so that said nipple forms a positive-locking twist-proof connection with a circular or non-circular compression sleeve 4 following compression. The nipple 3 and the compression sleeve 4 may be made of steel or of other metals.

In order to establish a connection that can be stressed by torsional moments (i.e., can be stressed by rotation) between a nipple 3 and a hose 2, a connecting device 1 is used, said device comprising a compression sleeve 4. Said compression sleeve is compressed with the nipple 3 in a non-circular manner at least at one point, so that the compression sleeve 4 and the nipple 3 are secured and connected to each other in a torsion-proof positive-locking manner. In contrast, the section 15 of the compression sleeve 4 comprising the hose 2 is preferably compressed in a circular manner, so that the hose 2 is seated—with uniform compression along its circumference—on the hose-receiving section 9 of the nipple 3. This results in a constructive separation of the region intended for sealing from the region intended for transmitting the torsional moment.

What is claimed is:

1. A connecting device for connecting a hose in a fluid-conveying system, the connecting device comprising:
    a nipple having a rotation-symmetrical hose-receiving section and, at a distance therefrom, an anti-twist section including a radially outward projecting annular bead that initially has a circular shape, the radially outward projecting annular bead extending radially outwardly beyond an outer radial diameter of portions of the nipple adjacent the anti-twist section of the nipple, and
    a compression sleeve that extends over the hose-receiving section and over the anti-twist section, the compression sleeve deformed in a non-circular manner to provide a positive-locking engagement with respect to a relative rotation in the anti-twist section,
    wherein the anti-twist section is a non-circular deformation of at least part of the nipple, and the radially outward projecting annular bead is deformed in a non-circular manner by the compression sleeve.

2. The connecting device of claim 1, wherein the anti-twist section is configured as a substantially circular annular bead provided on the nipple.

3. The connecting device of claim 2, wherein the compression sleeve has a radially inward-projecting annular rib that extends between two annular beads of the nipple.

4. The connecting device of claim 3, wherein, in its original state, the rib has an inside diameter that is greater than the outside diameter of one of the annular beads and is smaller than the outside diameter of the other annular bead.

5. The connecting device of claim 2, wherein the annular bead having the greater diameter is part of, or constitutes, the anti-twist section.

6. The connecting device of claim 5, wherein the section extending over said hose is essentially configured in a rotation-symmetrical manner.

7. A method for establishing an anti-twist connection between a nipple and a hose using a compression sleeve, comprising:
    sliding the hose onto a hose-receiving section of the nipple,
    positioning the compression sleeve so that a hose-securing section extends over the hose and an anti-twist section extends over an anti-twist section of the nipple including a radially outward projecting annular bead that initially has a circular shape, wherein the radially outward projecting annular bead extends radially outwardly beyond an outer radial diameter of portions of the nipple adjacent the anti-twist section of the nipple, and
    deforming the compression sleeve in an inward direction so that a non-circular joint is formed between the compression sleeve and the radially outward projecting annular bead of the nipple, and
    wherein the radially outward projecting annular bead is deformed in a non-circular manner by the compression sleeve to achieve the non-circular form of the non-circular joint.

8. The method of claim 7, wherein the part extending over the anti-twist section is deformed in radially outward direction at several points that are spaced apart in a circumferential direction.

9. The connecting device of claim 1, wherein an exterior form of the anti-twist section and an interior form of a corresponding section of the compression sleeve are complementary to each other and are configured to provide a torsion-resistant toothing between the nipple and compression sleeve.

* * * * *